(No Model.)
R. W. ARMSTRONG.
TRAP.
No. 277,656. Patented May 15, 1883.
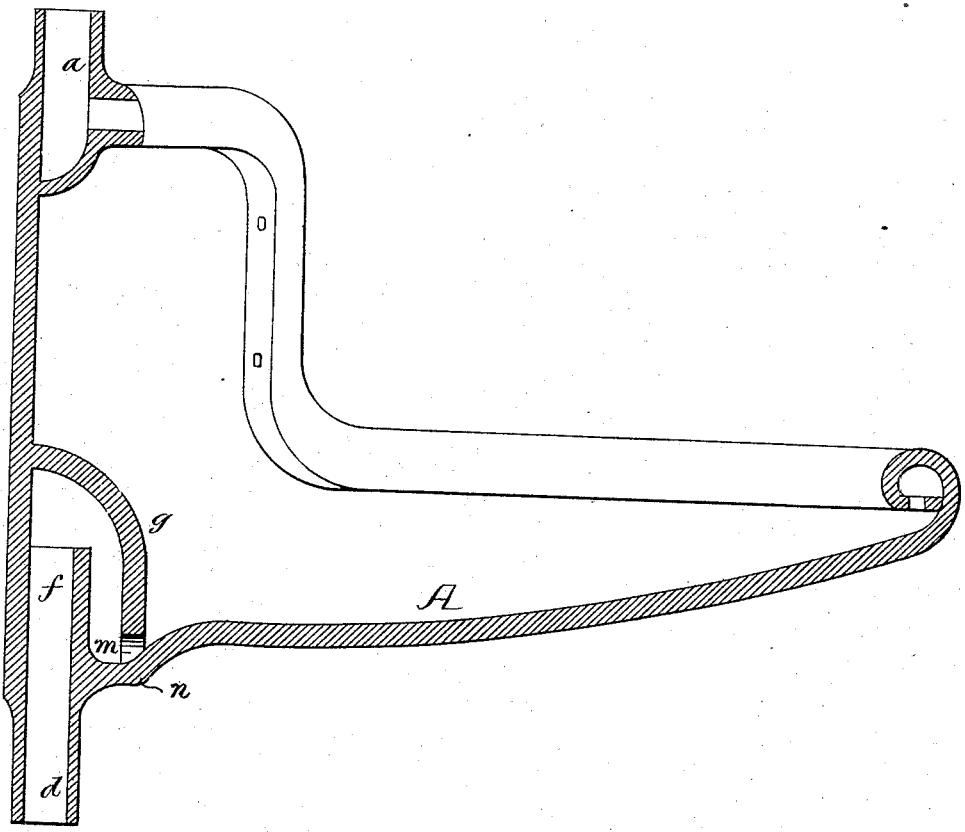
Witnesses:
James F. Jobin
Hamilton D. Turner.
Inventor:
Robert W. Armstrong
by his Attorneys
Howson and Son

UNITED STATES PATENT OFFICE.

ROBERT WILLIAMS ARMSTRONG, OF BELLEEK, COUNTY OF FERMANAGH, IRELAND.

TRAP.

SPECIFICATION forming part of Letters Patent No. 277,656, dated May 15, 1883.

Application filed September 2, 1882. (No model.) Patented in England September 11, 1879, No. 3,644.

*To all whom it may concern:*

Be it known that I, ROBERT WILLIAMS ARMSTRONG, a subject of the Queen of Great Britain and Ireland, and a resident of Belleek, in the county of Fermanagh, Ireland, have invented an Improved Trap for Urinal-Pans, Wash-Basins, &c., (for which I have obtained Letters Patent as follows: for Great Britain and Ireland, No. 3,644, September 11, 1879,) of which the following is a specification.

The object of my invention is to so construct a trap for urinals, sinks, wash-basins, &c., that the water will be kept at a desired level in the pan, an overflow maintained at all times, and the automatic flushing or emptying of the contents of the pan effected in case of accident or intentional increase in the volume of supply-water.

In the accompanying drawing is shown a longitudinal section of a urinal-pan with my improved trap.

A is the pan, which has the usual hollow rim communicating with the inlet branch $a$, so as to distribute the water throughout the pan. The pan has the usual discharge branch, $d$, which, however, is continued above the bottom of the pan in the form of a tube, $f$, and the latter is inclosed by a cap, $g$, near the base of which are openings $m$. Water will fill the pan up to the level of the top of the tube $f$, and will then overflow and escape through the outlet branch $d$. Any rise in the level of the water in the pan, tending to cause such an overflow as will fill the tube $f$ and branch $d$, induces a siphoning action and causes the withdrawal of almost all of the water from the pan, whereupon the siphon action will be discontinued and the water will again rise to the proper level.

The cap $g$ and tube $f$ may form part of the main structure, and may be molded therewith when said structure is made of terra-cotta; or the cap may consist of a separate piece of earthenware; or in some cases the trap may form an independent self-contained structure, adapted for attachment to existing sinks, wash-basins, urinal-pans, or other similar vessels.

The openings $m$ should be smaller than the area of the tube $f$ or the width of the passage between said tube and the cap, so that any foreign substances which will pass through the openings can be carried up over the top of the tube by the flow of water or by their buoyancy.

The base of the cap or hood $g$ is contained within a shallow recess or depression, $n$, in the bottom of the pan, so that but a small quantity of water is needed to trap the pan, and on each flushing of the pipe all of the water is withdrawn from the pan, except the limited amount needed to form the trap, the retention of a large body of foul water in the pan being prevented. The openings $m$ are convenient of access, so that clogging of the same or the accumulation of foreign matters in the trap can be readily prevented.

I claim as my invention—

The within-described trap for urinal-pans, basins, &c., said trap comprising a tube, $f$, projecting above the bottom of the pan, and a cap or hood, $g$, inclosing said tube and having openings $m$ at or near the base, which is contained in a shallow depression, $n$, in the bottom of the pan, as set forth.

In testimony whereof I have signed my name to this specification in the presence of two subscribing witnesses.

ROBERT WILLIAMS ARMSTRONG.

Witnesses:
A. L. ARMSTRONG,
D. ARMSTRONG.